May 19, 1936.  C. F. DE LANNOY  2,041,325
AUTOMOBILE DISTRESS SIGNAL
Filed May 29, 1934  2 Sheets-Sheet 1
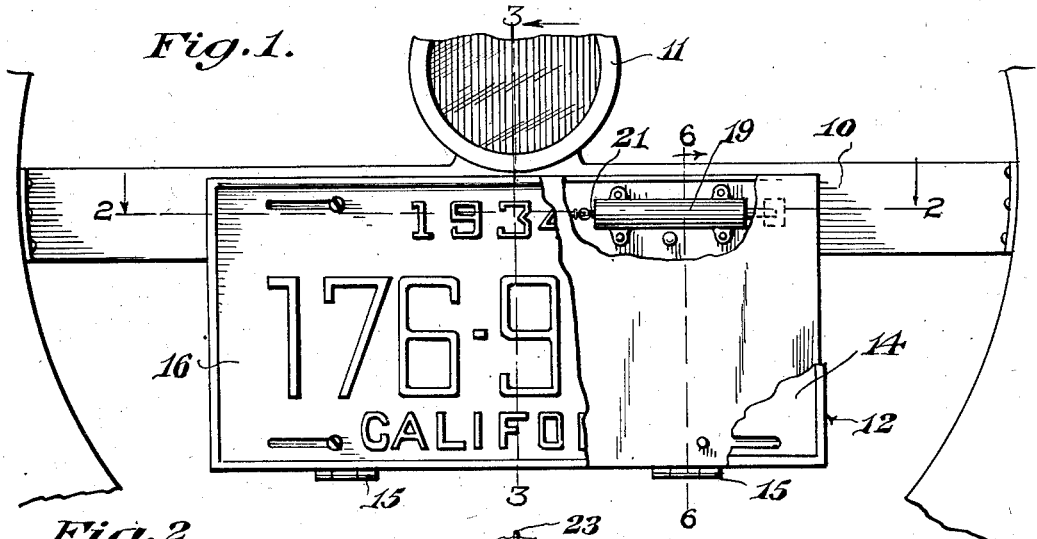
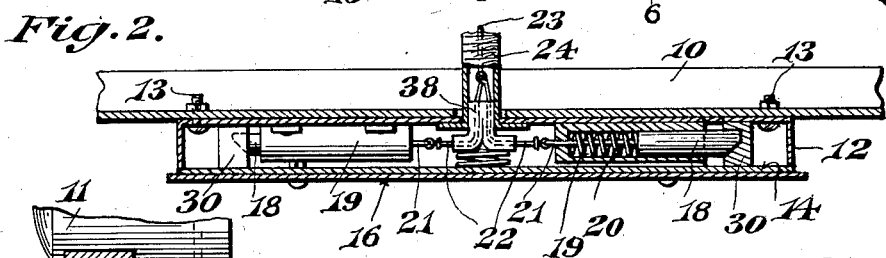
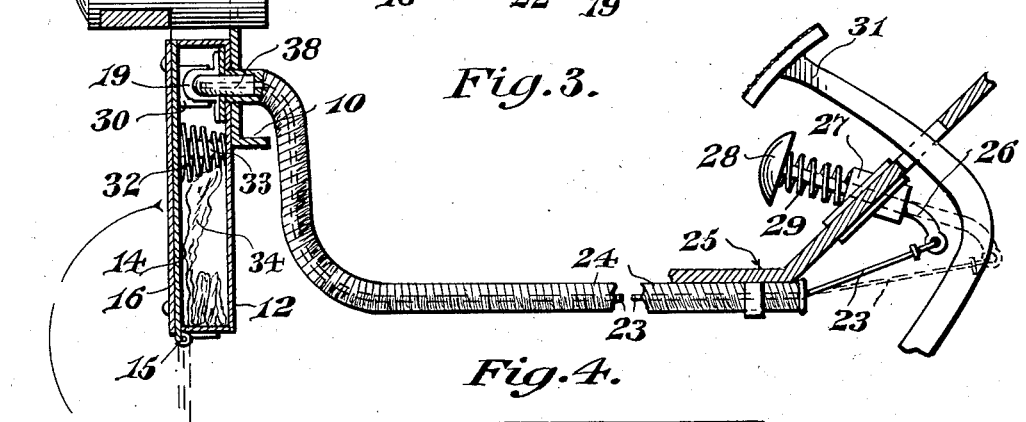
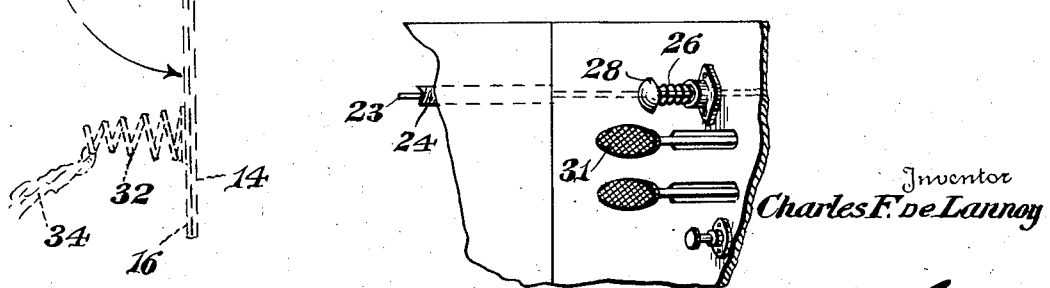
Inventor
Charles F. de Lannoy
By Irving L. McCathran
Attorney May 19, 1936.  C. F. DE LANNOY  2,041,325
AUTOMOBILE DISTRESS SIGNAL
Filed May 29, 1934   2 Sheets-Sheet 2
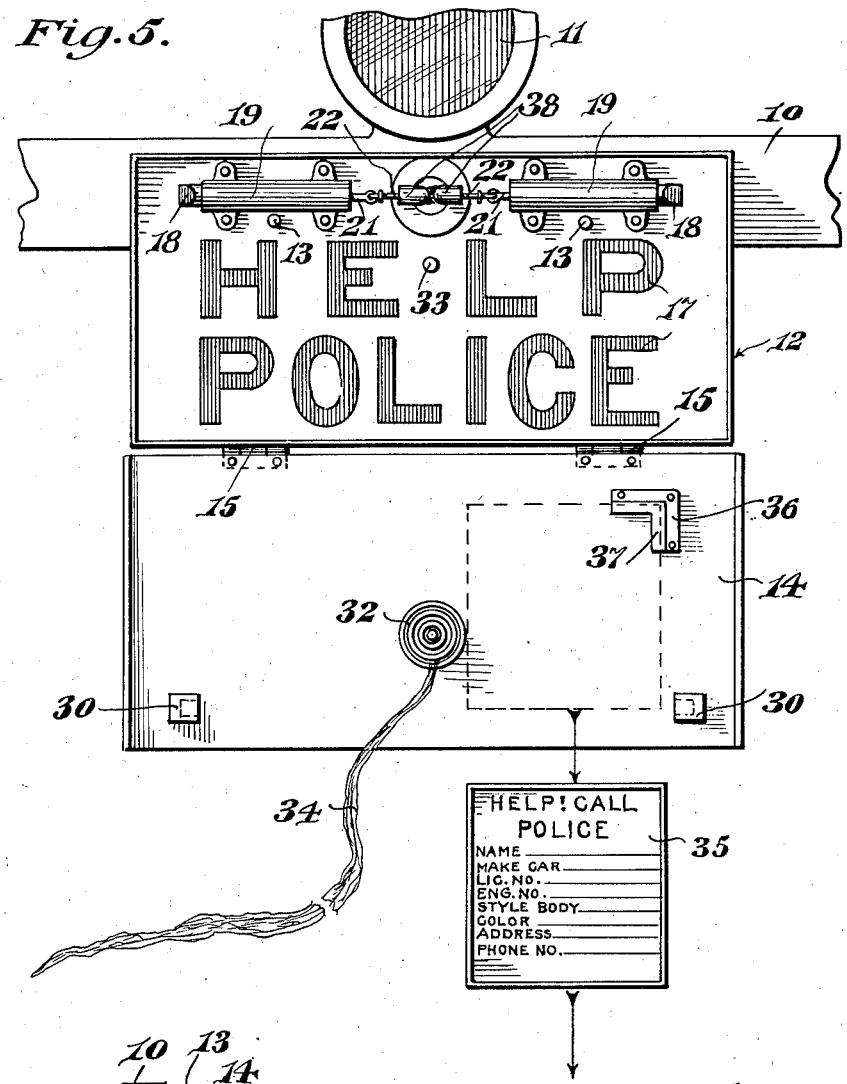
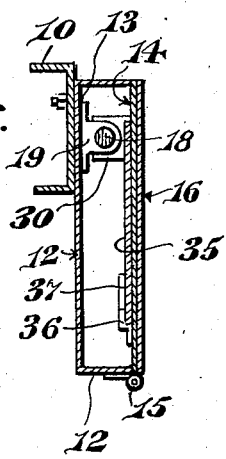
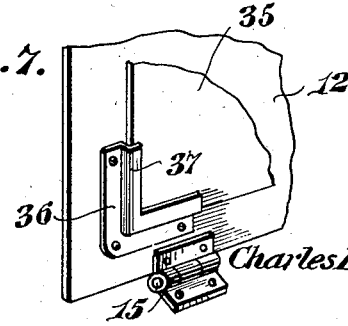

Patented May 19, 1936

2,041,325

UNITED STATES PATENT OFFICE 2,041,325

AUTOMOBILE DISTRESS SIGNAL

Charles F. de Lannoy, Carmel, Calif., assignor of forty-nine per cent to George E. Butler, Carmel, Calif.

Application May 29, 1934, Serial No. 728,167

9 Claims. (Cl. 116—33)

This invention relates to an automobile theft signalling device, and has for its object the production of a simple and efficient signalling device which may be so actuated as to signal for help in the event that an automobile should be stolen.

Another object of this invention is the production of a simple and efficient signalling device which may be actuated from the driver's seat for the purpose of releasing the signalling device and signal for help in the event that an automobile should be held up by a highwayman or other criminal, and the driver thereof compelled to move over from the driving position to the right hand side of the seat.

A further object of this invention is the provision of a simple and efficient signalling device which may be mounted upon the rear end of a vehicle for supporting the license tag, the signalling device being constructed and actuated from the driver's seat of the vehicle through the medium of a push-button on the floor adjacent the clutch pedal so as to release the signalling device and signal for help.

A still further object of this invention is the production of a simple and efficient signalling device whereby a visible signal may be displayed in the event of the stealing of a vehicle, and whereby a record card identifying the vehicle may be immediately dropped upon the highway when the signalling device is operated.

Other objects and advantages of the present invention will appear throughout the following specification and claims.

In the drawings:—

Figure 1 is a rear elevation of the signalling device, certain parts thereof being broken away;

Figure 2 is a section taken on the line 2—2 of Figure 1;

Figure 3 is a section taken on the line 3—3 of Figure 1;

Figure 4 is a top plan view partly in section of the floor board of the vehicle showing the relative position of the clutch and brake pedals, the starter button, and the signal release button;

Figure 5 is a rear elevation of the signalling device shown in an open or released position;

Figure 6 is a vertical sectional view through the signal casing in the closed position taken on line 6—6 of Figure 1;

Figure 7 is a fragmentary perspective view of one of the lower corners of the hinged door of the signalling device which is adapted to support the license plate.

By referring to the drawings, it will be seen that 10 designates the conventional license plate holder which may support the conventional tail-light 11. It should be understood that any suitable or desired supporting means, such as the holder 10 and the relative location of the tail-light 11 may be varied without departing from the spirit of the invention.

In carrying out my invention, I preferably mount the signal casing 12 upon the support 10, which support may be of any suitable or desired structure or type, the signal casing 12 preferably being of a box-like structure, and being secured to the support 10 by means of suitable securing bolts 13. This signal casing 12 is provided with a rear hinged door 14, the door being secured to the casing 12 by means of suitable hinges 15. This door 12 carries upon its outer face a conventional license plate 16, which license plate 16 may be supported upon the door in any suitable or desired manner. The casing 12 is placed below the tail-light 11 in the conventional manner so that the light 11 will cast its rays down upon the interior of the casing 12 when the door 14 is swung to an open position and when the door 14 is in a closed position, the tail-light is adapted to illuminate the license plate 16 as will be obvious.

The inner face of the casing 12 is preferably provided with suitable indicia or printed words preferably red on white background, the words preferably being "Help police", as indicated by the numeral 17. The words are preferably displayed in bold letters to attract attention to the signal. Located in the upper end of the casing 12 is a pair of oppositely extending spring pressed bolts 18, each bolt 18 being mounted within a suitable casing or housing 19, the springs 20 being mounted within the housing 19 and normally urging the bolts 18 to an extended position. Each bolt 18 is provided with a reduced extension 21, and the reduced extensions 21 of the bolts 18 are connected to the pull wires 22, which pull wires 22 are in turn connected to a central pull wire 23 passing through a conduit 24 secured to the casing 12. A suitable guiding elbow device 38 is carried at the inner end of the conduit 24 to constitute a guide for the pull wires 22. The conduit 24 passes under the floor board 25 and the pull wire 23 is connected to an operating plunger 26, which plunger 26 is slidably mounted through a sleeve 27 carried by the floor board 25. The plunger 26 carries a button 28 at its outer end and a coil spring 29 is carried by the plunger 26 to normally hold the plunger in an inwardly extended position with respect to the floor board 25. When it is desired to actuate the signal the button 28 may be depressed to force the plunger 26 to the position shown in dotted lines in Figure 3, thereby pulling upon the cable 23 and pulling the plungers 18 inwardly of the casing 19.

The inner face of the door 14 supports a pair of socket lugs 30 which are adapted to be normally engaged by the outer ends of the plungers or bolts 18 for the purpose of holding the door in a closed position. As the bolts 18 fit in the socket lugs 30, the door 14 will be held in a closed position, but as the cable 23 is pulled by the depression of the button 28, the bolts 18 will be drawn out of engagement with the socket lugs 30 and the door 14 will immediately swing to the position shown in dotted lines in Figure 3, displaying the signal within the casing 12.

As shown in Figure 4, the button 28 and plunger 26 are preferably located near the clutch pedal 31 to facilitate the operation of the signal as will be hereinafter described.

To facilitate the opening of the door 14, a conical coil spring 32 is secured to the inner face of the door 14, the enlarged end of the coil spring being fixed in any suitable or desired manner to the inner face of the door 14 and the smaller or tapered end of the coil spring is adapted to fit around the retaining pin or lug 33 which is secured to the casing. This spring 32 is of the expansion type and as soon as the door 14 is released the expansion of the spring 32 will cause the spring to be forced off the retaining pin 33 and immediately swing the door 14 to an open position. The pin 33 is merely adapted to hold the spring 32 in its proper relative position when the door is closed. Secured to this spring is a fabric or other suitable pennant 34 preferably made of red cloth for the purpose of adding further means for attracting attention as well as signalling for help.

As an additional means of identification, a card 35 may be supported upon the inner face of the door 14 by resting in the angle retaining clip, which angle retaining clip 36 is provided with an overhanging flange 37 to normally hold the card 35 in a position upon the inner face of the door 14. The card 35 only rests within the angle retaining clip 36 sufficiently to normally rest in position when the door is closed and allow the card to drop immediately out of the clip 37 when the door is swung to an open position. The swinging movement of the door and the resultant movement of the car upon which the signal is mounted will also tend to jar the card 35 loose or release the same. This card 35 preferably contains a notice reading "Help call police", and contains a record giving the name of the owner, the make of the car, the license number, the engine number, the style of the body, the color of the body, the address and telephone number of the owner. Other identifying means may also be contained upon the card, if desired, and the card may be printed on both sides.

From the foregoing description, it will be seen that a very simple and efficient signalling device has been provided which will permit the occupant of a car or the owner of the car to release a signal if he should be held up in an attempt to steal the car, and if ordered to stop the driver will naturally depress the clutch pedal and in so doing he may slightly shift his foot and at the same time depress the button 28, thereby releasing the signal and opening the door 14.

Furthermore, should the car be unoccupied and an attempt be made to steal the same, it is quite probable that the thief would not be familiar with the operation of the signal and in actuating the clutch pedal 31, the button 28 would also in all probability be depressed sooner or later, thereby actuating the signal and greatly increasing the chances of apprehending the thief and recovering the stolen car or automobile.

As will be obvious by considering the drawings, the signalling device only supports the rear license plate and the front license plate will remain supported in the conventional manner. Normally, the license number of the car may be readily observed for the purpose of identification, but when the signalling device is in operation the fact that the license number does not appear upon the rear of the car will also tend to call attention to the signalling device.

It should be understood that certain detail changes in the mechanical construction, combination and arrangement of parts may be employed without departing from the spirit of the invention, so long as these changes fall within the scope of the appended claims, and the particular design of the casing or call box may be varied to fit the plate holder and tail light bracket of the various types of cars upon which the device may be used.

Having described the invention, what is claimed as new is:—

1. A signalling device of the class described comprising a casing having visible signalling means, a door hinged to said casing and adapted to be swung to a shielding position to prevent the observation of the signalling means, remote control means carried by the casing and engaging the door for normally holding the door in a closed position and capable of being released from said door to permit the door to automatically swing to an open displaying position, said door being adapted to support a license plate upon its outer face, and means carried by the door and engaging the casing for facilitating the moving of the door from a closed to an open position when released.

2. A signalling device of the class described comprising a casing having visible signalling means, a door hinged to said casing and adapted to be swung to a shielding position to prevent the observation of the signalling means, remote control means carried by the casing and engaging the door for normally holding the door in a closed position and capable of being released from said door to permit the door to automatically swing to an open displaying position, said door being adapted to support a license plate upon its outer face, and a spring carried by the door and engaging the casing for facilitating the movement of the door from a closed to an open position when released.

3. A signal of the class described comprising a casing, a door hingedly secured to the lower edge of said casing, oppositely extending spring pressed plungers carried by the casing, latching lugs carried by the door and engageable by said plungers for normally holding the door in a closed position, remote control means engaging the plungers for releasing the plungers from said lugs whereby said door may be swung from a closed to an open position when said plungers are released, and said casing carrying visible signalling means.

4. A signal of the class described comprising a casing, a door hingedly secured to the lower edge of said casing, oppositely extending spring pressed plungers carried by the casing, latching lugs carried by the door and engageable by said plungers for normally holding the door in a closed position, remote control means engaging the plungers for releasing the plungers from said lugs whereby said door may be swung from a closed to an open position when said plungers are released, said casing carrying visible signalling means, and a conical expansion spring secured to said door and having the reduced end thereof contacting with the casing for normally exerting an outward opening pressure upon the door to facilitate the opening of the door when released, and guiding means carried by the casing and engaging the reduced end of the conical spring for holding the spring in engagement with the casing when the door is in a closed position.

5. A signal of the class described comprising a casing, a door hingedly secured to the lower edge of said casing, oppositely extending spring pressed plungers carried by the casing, latching lugs carried by the door and engageable by said plungers for normally holding the door in a closed position, remote control means engaging the plungers for releasing the plungers from said lugs whereby said door may be swung from a closed to an open position when said plungers are released, said casing carrying visible signalling means, a conical expansion spring secured to said door and having the reduced end thereof contacting with the casing for normally exerting an outward opening pressure upon the door to facilitate the opening of the door when released, guiding means carried by the casing and engaging the reduced end of the conical spring for holding the spring in engagement with the casing when the door is in a closed position, and a signal pennant carried by the door.

6. A signalling device of the class described comprising a support, a door carried by the support, a visible signal displayed upon said support, the door being adapted to normally hide the visible signal when the door is in a closed position, means for normally holding the door in a closed position, remote control means for releasing the door, and an identification means releasably carried by the door and adapted to be detached from the door when the door is swung to an open position.

7. In combination with an automobile having a floor board, a clutch pedal, an operating plunger located adjacent the clutch pedal, a signal casing having a visible signal means, a door hinged to said casing and adapted to normally remain in a closed position for shielding the visible signal means, and means engaging the door and carried by the casing and controlled by said plunger for releasing the door and allowing the door to swing from a closed to an open position.

8. A signalling device of the class described comprising a support, a signal carried by said support, a closure member releasably supported upon the support for normally hiding said signal and movable to uncover said signal for displaying said signal, means for locking the closure member in a position to hide the signal from view, and means for releasing the locking means whereby the closure member may move to a position to uncover said signal for displaying said signal.

9. A signal of the class described comprising a support, a visible signalling means carried by the support, a closure member supported in conjunction with the support and adapted to carry a license tag, locking means for holding said closure member in a position upon said support whereby the visible signalling means will be shielded from view, and means for releasing said locking means and causing said closure member to drop away from said visible signalling means for displaying said visible signalling means.

CHARLES F. DE LANNOY.